(12) United States Patent
Ono

(10) Patent No.: US 11,323,580 B2
(45) Date of Patent: May 3, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Yusuke Ono, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 181 days.

(21) Appl. No.: 16/532,495

(22) Filed: Aug. 6, 2019

(65) Prior Publication Data

US 2020/0059569 A1 Feb. 20, 2020

(30) Foreign Application Priority Data

Aug. 15, 2018 (JP) .............................. JP2018-152934

(51) Int. Cl.
*H04N 1/00* (2006.01)

(52) U.S. Cl.
CPC ....... *H04N 1/00477* (2013.01); *H04N 1/0049* (2013.01); *H04N 1/00251* (2013.01); *H04N 1/00408* (2013.01); *H04N 2201/0094* (2013.01)

(58) Field of Classification Search
CPC ........... H04N 1/00477; H04N 1/00408; H04N 1/00251; H04N 1/0049; H04N 2201/0094; H04N 1/00037; H04N 1/00315; H04N 1/00832; H04N 1/00079; H04N 1/00076; H04N 1/4413
USPC ........................................................ 358/1.15
See application file for complete search history.

(56) References Cited

U.S. PATENT DOCUMENTS

| | | | |
|---|---|---|---|
| 9,083,834 B2 | 7/2015 | Toyamasaki | |
| 9,207,884 B1* | 12/2015 | Baratharajan | ...... H04N 1/32117 |
| 9,213,815 B2 | 12/2015 | Nishii | |
| 9,507,550 B2* | 11/2016 | Yasuda | ................. G06F 3/1238 |
| 9,906,674 B2 | 2/2018 | Nishii | |
| 2014/0153031 A1 | 6/2014 | Toyamasaki | |
| 2015/0062612 A1 | 3/2015 | Nishii | |
| 2016/0100074 A1 | 4/2016 | Nishii | |
| 2019/0196768 A1* | 6/2019 | Sugimoto | ............. G06F 3/1204 |

FOREIGN PATENT DOCUMENTS

| | | |
|---|---|---|
| JP | 2014112274 | 6/2014 |
| JP | 2015045916 | 3/2015 |

* cited by examiner

*Primary Examiner* — Neil R McLean
(74) *Attorney, Agent, or Firm* — JCIPRNET

(57) ABSTRACT

An information processing apparatus includes a controller. The controller performs control such that, when a logged-in user is located within a first predetermined range from the apparatus, a second user approaching the apparatus is notified that the apparatus is in use.

12 Claims, 5 Drawing Sheets

DETECTED-USER LIST

| USER ID | DETECTED DEVICE | | LOGGED-IN SENSOR |
|---|---|---|---|
| | NEAR-FIELD COMMUNICATION DEVICE | HUMAN SENSOR | |
| userA | 0.3 m | | ○ |
| userF | 9.0 m | | |
| userH | 0.8 m | ○ | |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-152934 filed Aug. 15, 2018.

BACKGROUND

(i) Technical Field

The present disclosure relates to information processing apparatuses and non-transitory computer readable media.

(ii) Related Art

When a multifunction apparatus set in a business office is to be used, a user is able to use the multifunction apparatus exclusively by logging into the multifunction apparatus. Then, for example, the user makes a command for executing a printing process by operating an operation panel of the multifunction apparatus. For example, see Japanese Unexamined Patent Application Publication Nos. 2014-112274 and 2015-045916.

The size of the apparatus increases in accordance with functions included therein. For example, in the case of a multifunction apparatus, a printed-material output tray is normally set at a position distant from the operation panel due to the apparatus being equipped with a finishing function and a paper folding function. In this case, when the logged-in user moves away from the front of the operation panel toward the position of the output tray to collect a printed material, another user located near the multifunction apparatus may mistakenly believe that the multifunction apparatus is not being used due to the absence of any users in front of the operation panel.

SUMMARY

Aspects of non-limiting embodiments of the present disclosure relate to notifying a user approaching an apparatus that another user is using the apparatus.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing apparatus including a controller. The controller performs control such that, when a logged-in user is located within a first predetermined range from the apparatus, a second user approaching the apparatus is notified that the apparatus is in use.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will be described below with reference to the drawings.

Figure 1:
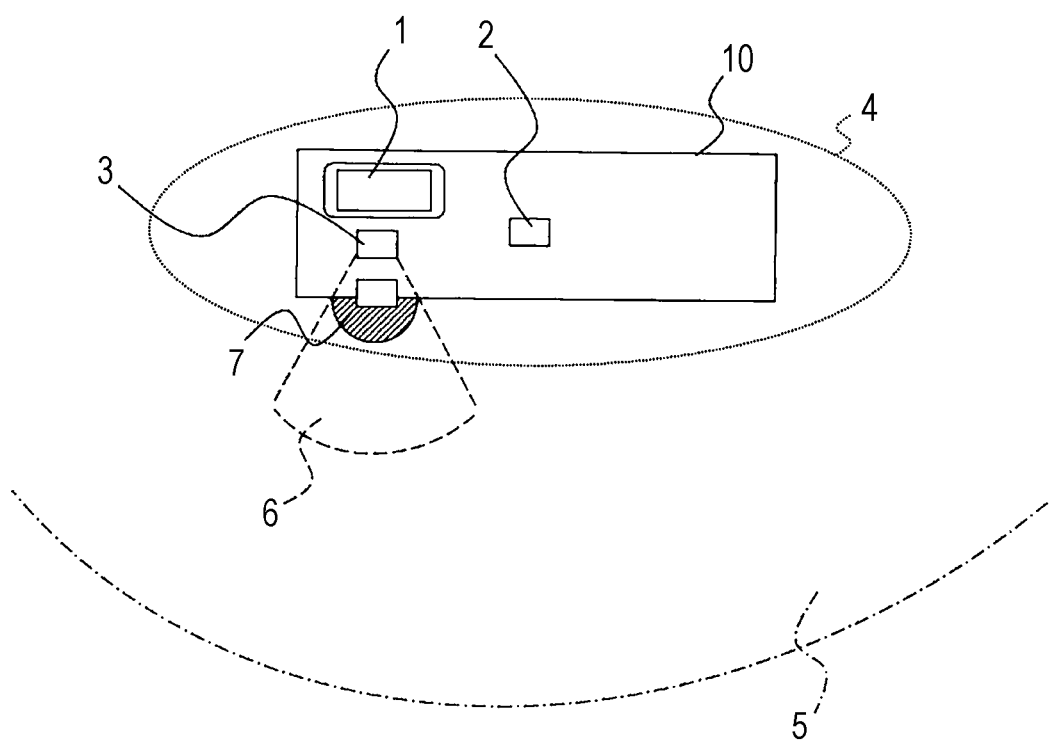
FIG. 1 schematically illustrates the relationship between a multifunction apparatus according to this exemplary embodiment and user detection ranges.

FIG. 1 schematically illustrates the relationship between a multifunction apparatus 10 according to an exemplary embodiment and user detection ranges in the vicinity of the multifunction apparatus 10. For example, the multifunction apparatus 10 is set in a business office and is shared by multiple users, such as employees. The multifunction apparatus 10 according to this exemplary embodiment is assumed to be a relatively large-scale apparatus due to being equipped with, for example, a finishing function and a paper folding function. The multifunction apparatus 10 is equipped with an operation panel 1, a near-field communication device 2, and a human sensor 3. The operation panel 1 is a user interface unit, is operated by a user using the multifunction apparatus 10, and displays various types of information, such as a menu screen. The operation panel 1 according to this exemplary embodiment is disposed at one side of the multifunction apparatus 10, that is, at an upper left surface of the multifunction apparatus 10 in FIG. 1.

The near-field communication device 2 uses, for example, a Bluetooth (registered trademark) Low Energy (BLE) based near-field communication technology to communicate with a communication terminal equipped with a wireless communication function, such as an Internet-of-Things (IoT) device. Furthermore, in this exemplary embodiment, the near-field communication device 2 is used not only as a communication unit that performs near-field communication, but also as an identifying unit that measures and identifies the present location of the communication terminal. The near-field communication device 2 according to this exemplary embodiment defines two types of detection ranges 4 and 5. The detection range 4 is a first predetermined range where it is presumed that a user who has logged into the multifunction apparatus 10 (also referred as "logged-in user" hereinafter) is using the multifunction apparatus 10 (i.e., is in the logged-in state) even if the logged-in user has not operated the operation panel 1 for a predetermined time period. In other words, when the logged-in user is being detected within the detection range 4, it is presumed that the multifunction apparatus 10 is in use even if the logged-in user is not operating the operation panel 1. For example, a range of about 40 cm around the multifunction apparatus 10 is set as the detection range 4. The detection range 5 is a second predetermined range encompassing the detection range 4 and is a range where it is presumed that a user other than the logged-in user (also referred to as "second user"

hereinafter) has approached the multifunction apparatus 10. In other words, it is presumed that the second user detected within the detection range 5 may possibly have an intention of using the multifunction apparatus 10. For example, a range of about 10 m around the multifunction apparatus 10 is set as the detection range 5. The detection ranges 4 and 5 described above are merely examples and are not limited to the above examples. In particular, the detection range 5 may be appropriately set in view of the set position of the multifunction apparatus 10 or the layout of the room in which the multifunction apparatus 10 is set. Although a single near-field communication device 2 is shown at the center of the multifunction apparatus 10 in FIG. 1 for the sake of convenience, the near-field communication device 2 may be constituted of a combination of multiple devices in accordance with, for example, the size and shape of the multifunction apparatus 10.

The human sensor 3 is used for detecting humans and serves as an identifying unit that detects and identifies a user approaching the multifunction apparatus 10, particularly, the operation panel 1. The human sensor 3 has a fan-shaped detection range 6, as shown in FIG. 1. For example, the human sensor 3 detects a user located in a range of about 1 m in front of the operation panel 1. To differentiate a user who is operating the operation panel 1 from a user who is approaching the operation panel 1, the human sensor 3 may further detect a user located within a semicircular operable range 7 shown in FIG. 1. The operable range 7 is an example of a position where a user is capable of operating the operation panel 1. The human sensor 3 may be constituted of a combination of two types of sensors. For example, a user located within the detection range 6 may be identified by a pyroelectric sensor, and a user located within the operable range 7 may be identified by a reflection sensor. As described above, the detection range 5 defined by the near-field communication device 2 is used as the second predetermined range where it is presumed that a user has approached the multifunction apparatus 10. Alternatively, as will be described in detail later, the detection range 6 defined by the human sensor 3 may sometimes be used, depending on the conditions.

Figure 2:
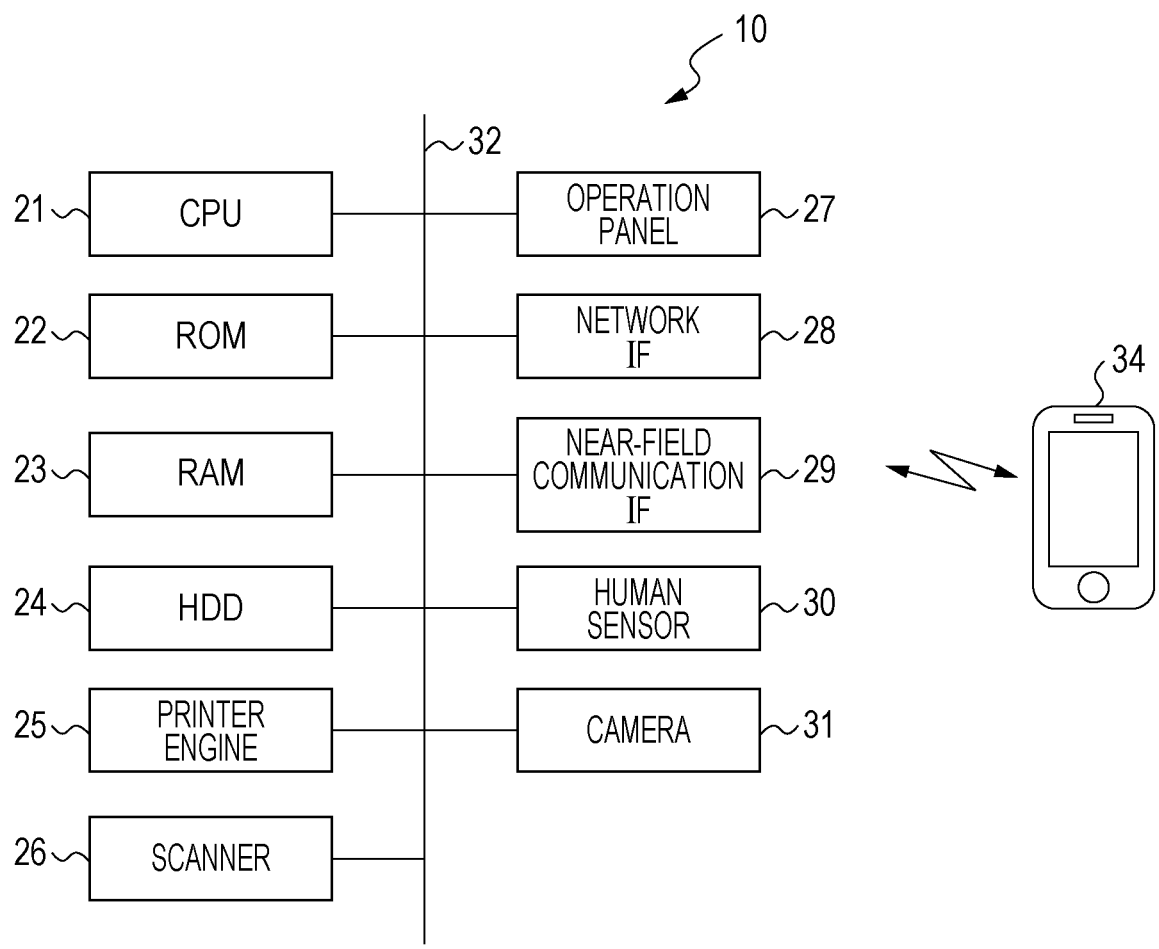
FIG. 2 illustrates a hardware configuration of the multifunction apparatus according to this exemplary embodiment.

FIG. 2 illustrates a hardware configuration of the multifunction apparatus 10 according to this exemplary embodiment. The multifunction apparatus 10 is an example of an image forming apparatus equipped with various types of functions, such as a copying function and a scanning function, and contains a computer. In FIG. 2, a central processing unit (CPU) 21 controls the operation of each type of mechanism included in the apparatus, such as a printer engine 25 and a scanner 26, in accordance with a program stored in a read-only memory (ROM) 22. An address data bus 32 performs data communication by connecting with each type of mechanism to be controlled by the CPU 21. The ROM 22 stores various types of programs related to controlling of the apparatus, exchanging of electronic data, and execution of jobs. The various types of programs are executed so that components to be described below exhibit predetermined processing functions. A random access memory (RAM) 23 is used as a work memory when a program is executed or as a buffer when a job is executed. A hard disk drive (HDD) 24 stores, for example, an electronic document read by using the scanner 26. The printer engine 25 prints an image onto an output sheet in accordance with a command from a control program executed by the CPU 21. The scanner 26 reads a document set by a user and stores electronic data of the read document in the HDD 24. An operation panel 27 receives a command from a user and displays information.

The operation panel 27 corresponds to the operation panel 1 shown in FIG. 1. A network interface (IF) 28 connects with a network and is used for receiving a job transmitted to the apparatus or for accessing the apparatus via a browser. A near-field communication interface (IF) 29 performs near-field communication with a portable terminal 34 in accordance with a predetermined near-field communication technology, namely, BLE in this exemplary embodiment. The near-field communication IF 29 functions as the near-field communication device 2 shown in FIG. 1. A human sensor 30 identifies a user approaching the multifunction apparatus 10. The human sensor 30 corresponds to the human sensor 3 shown in FIG. 1. A camera 31 is an imaging unit that identifies a user approaching the multifunction apparatus 10. Although the camera 31 and the human sensor 30 are included as user identifying units in the multifunction apparatus 10 in this exemplary embodiment, the multifunction apparatus 10 may include at least one of the human sensor 30 and the camera 31.

The multifunction apparatus 10 may also be equipped with a controller that controls the function of, for example, a finisher, but such a controller is not shown in the drawings since it is not used for explaining this exemplary embodiment. The portable terminal 34 corresponds to the aforementioned communication terminal equipped with the near-field communication function and carried by a user when moving within the business office.

Figures 3, 4:
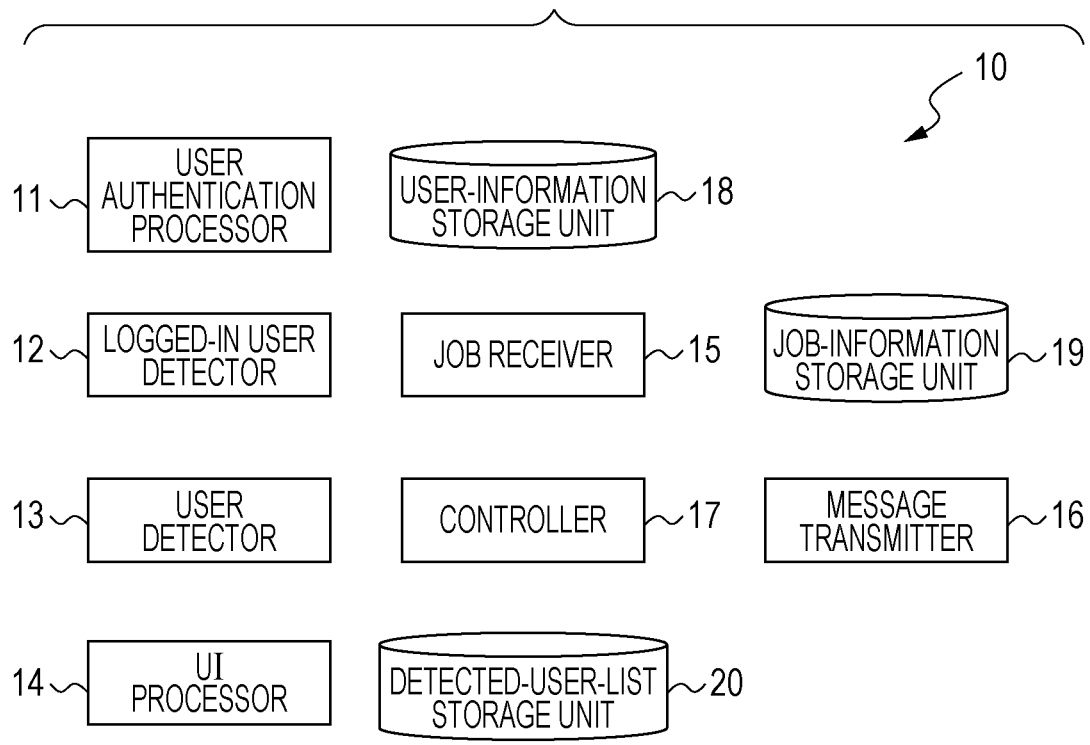
FIG. 3 is a block diagram of the multifunction apparatus according to this exemplary embodiment.
FIG. 4 illustrates a data configuration example of a detected-user list stored in a detected-user-list storage unit according to this exemplary embodiment.

FIG. 3 is a block diagram of the multifunction apparatus 10 according to this exemplary embodiment. The multifunction apparatus 10 includes a user authentication processor 11, a logged-in user detector 12, a user detector 13, a user interface (UI) processor 14, a job receiver 15, a message transmitter 16, a controller 17, a user-information storage unit 18, a job-information storage unit 19, and a detected-user-list storage unit 20. Components not used for explaining this exemplary embodiment are omitted from the drawing.

The user authentication processor 11 performs user authentication when a user logs into the multifunction apparatus 10. The logged-in user detector 12 operates in cooperation with the near-field communication device 2 to detect a logged-in user located within the detection range 4 shown in FIG. 1 from the multifunction apparatus 10. The user detector 13 operates in cooperation with the near-field communication IF 29 to detect a second user located within the detection range 5 shown in FIG. 1 from the multifunction apparatus 10. The user detector 13 also operates in cooperation with at least one of the human sensor 30 and the camera 31 to detect a second user located within the detection range 6.

The UI processor 14 receives a user operation performed on the operation panel 1 and displays information, such as various screens and messages. The job receiver 15 receives a job generated by a user as a process request from the user and stores the job in the job-information storage unit 19. The message transmitter 16 transmits a message to the portable terminal 34 by near-field communication under the control of the controller 17. The controller 17 controls the operation of the multifunction apparatus 10 by operating in cooperation with the components 11 to 16. In particular, when a logged-in user is located within the detection range 4, the controller 17 performs control to provide a notification that the multifunction apparatus 10 is in use to a second user presumed as having approached the multifunction apparatus 10 by being detected within the detection range 5.

User information related to a user using the multifunction apparatus 10 is registered in the user-information storage unit 18. The user information at least has set therein authentication information (user ID and password) used for user authentication by the user authentication processor 11. When a portable-terminal registration process is completed, identification information (terminal ID) of the portable terminal 34 used by the user is associated with the authentication information so that the portable terminal 34 and the user are linked with each other.

The job-information storage unit 19 has registered therein job information that is received by the job receiver 15 and that is related to an unprocessed job. The job information at least has set therein identification information (user ID) of the user (job owner) who has transmitted the job.

FIG. 4 illustrates a data configuration example of a detected-user list stored in the detected-user-list storage unit 20 according to this exemplary embodiment. The detected-user list is a list of users detected by the near-field communication device 2 or the human sensor 3. In the detected-user list, a user ID of each detected user is associated with a near-field communication device item, a human sensor item, and a logged-in user item. In the near-field communication device item, the distance from the multifunction apparatus 10 to a detected user is set if the user is detected by the near-field communication device 2. Accordingly, it is determinable whether the location where the user is detected is within the detection range 4 or within the detection range 5 (excluding the detection range 4). In the human sensor item, flag information indicating that a user is detected is set if the user is detected by the human sensor 3. In the logged-in user item, flag information indicating that a user is in a logged-in state is set if the user is logged in the multifunction apparatus 10.

The components 11 to 17 in the multifunction apparatus 10 are realized as a result of cooperative operation between the computer equipped in the multifunction apparatus 10 and a program executed by the CPU 21 equipped in the computer. The storage units 18 to 20 are realized by the HDD 24 equipped in the multifunction apparatus 10. Alternatively, the RAM 23 may be used or an external storage unit may be used via a network.

The program used in this exemplary embodiment may be provided via a communication unit or may be provided by being stored in a computer readable storage medium, such as a compact disc read-only memory (CD-ROM) or a USB memory. The program provided via the communication unit or from the storage medium is installed in the computer, and the CPU of the computer sequentially executes the program so that various types of processes are realized.

Next, the operation according to this exemplary embodiment will be described.

The near-field communication device 2 and the human sensor 3 in the multifunction apparatus 10 operate at all times to detect a user. Specifically, the near-field communication device 2 detects a user entering the detection range 5 by performing near-field communication with a portable terminal 34 carried by the user, and also measures the location of the user (i.e., the distance between the multifunction apparatus 10 and the user). Therefore, the near-field communication device 2 is not capable of detecting a user not carrying a near-field communicable portable terminal 34. In this case, another human detecting unit, such as a human sensor, may be used in place of the near-field communication device 2 to detect a user. When the near-field communication device 2 detects a portable terminal 34, the user detector 13 transmits information related to that detection, such as the terminal ID of the relevant portable terminal 34, to the controller 17. The controller 17 newly registers a record (detected-user information) containing the user ID of the detected user in the detected-user list based on the information from the user detector 13, and also sets the distance to the user in the near-field communication device item of the record. By comparing the set distance with the detection range 4, it is determinable whether the logged-in user is located within the detection range 4. Furthermore, when the human sensor 3 detects that a user is located within the detection range 6, the user detector 13 transmits information related to that detection to the controller 17. The controller 17 sets flag information indicating the detection in the human sensor item corresponding to the detected user in the detected-user list based on the information from the user detector 13. In FIG. 4, a circle indicates that the flag information is set.

The above process corresponds to a case where a user is detected. When it is detected that the user has moved outside the detection range 6 (i.e., the detected user is no longer detected), the controller 17 clears the flag information set in the human sensor item of the detected-user list. When it is detected that the user has moved outside the detection range 5, the controller 17 deletes the record (detected-user information) of the relevant user from the detected-user list.

The job receiver 15 operates independently from the user detection process, receives a job transmitted from a user, and stores the job in the job-information storage unit 19.

Figure 5:
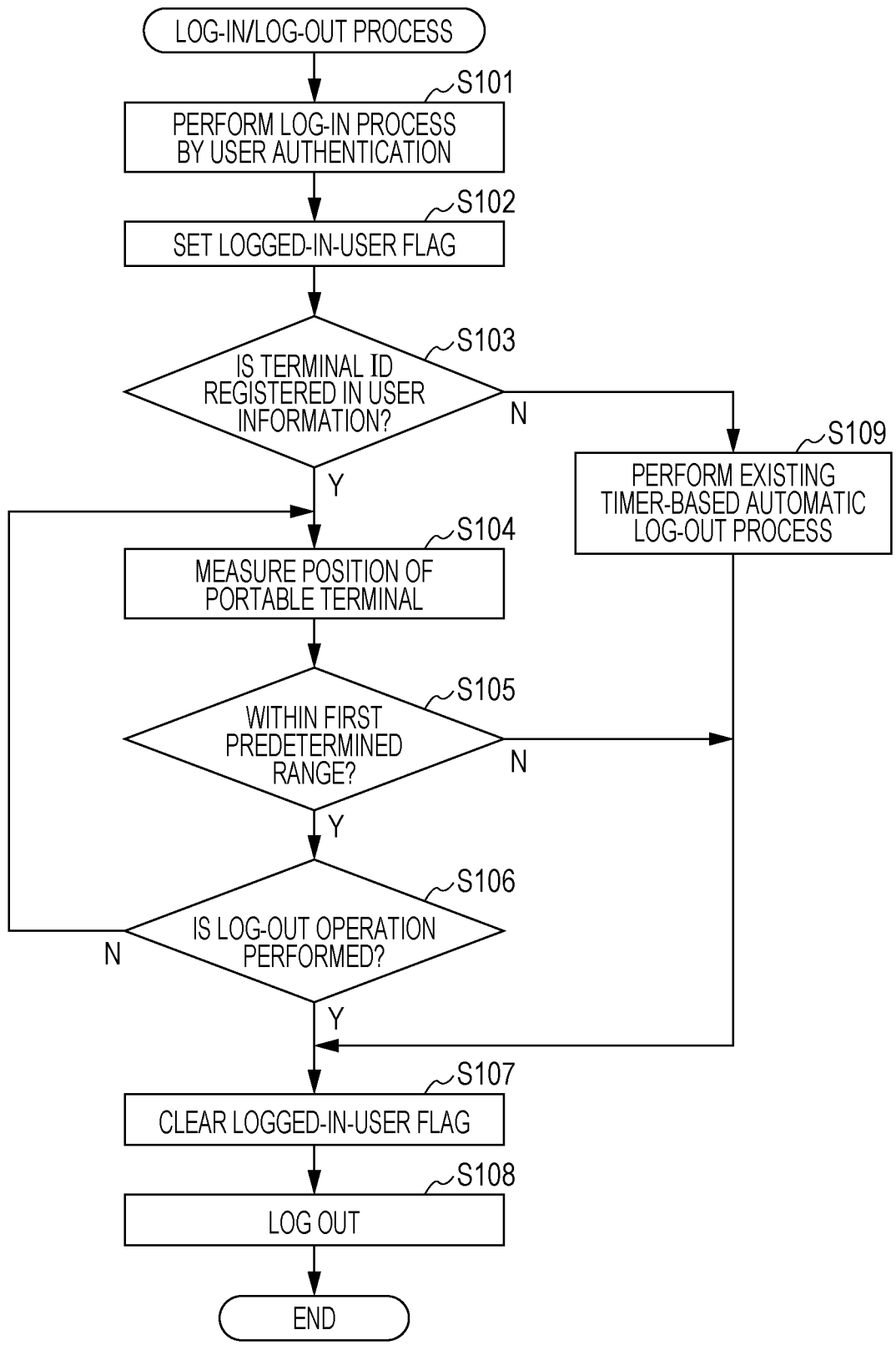
FIG. 5 is a flowchart illustrating a process from when a user logs into the multifunction apparatus to when the user logs out from the multifunction apparatus, in accordance with this exemplary embodiment.

The following description with reference to a flowchart shown in FIG. 5 relates to a process from when a user logs into the multifunction apparatus 10 to when the logged-in user logs out from the multifunction apparatus 10.

First, in a state where no one is logged in the multifunction apparatus 10, the user moves to a location where the user is capable of operating the operation panel 1 of the multifunction apparatus 10 to log into the multifunction apparatus 10. Although the detected-user list is updated in accordance with this movement, the process thereof will be omitted since it has already been described above. The user then inputs a user ID and a password via a predetermined log-in screen displayed on the operation panel 1. In step S101, the user authentication processor 11 compares the user ID and the password input by the user with information registered in the user-information storage unit 18 so as to perform user authentication. In this case, it is assumed that the log-in process is successful. In step S102, when the user successfully logs into the multifunction apparatus 10, the controller 17 sets flag information indicating that the user is a logged-in user in the logged-in user item of the detected-user information of the relevant user in the detected-user list. In FIG. 4, a circle indicates that the flag information is set. Since the user is standing in front of the operation panel 1 at the time when the log-in process is successful, the user is located within the detection range 4.

By logging into the multifunction apparatus 10, the user is able to exclusively use the multifunction apparatus 10. However, if the terminal ID of the portable terminal 34 carried by the logged-in user is not linked with the user ID of the logged-in user due to the terminal ID not being registered in the user information (N in step S103), an existing timer-based automatic log-out process is applied in step S109. Specifically, if the logged-in user does not operate the operation panel 1 for a fixed time period, the logged-in user is automatically logged out from the multifunction apparatus 10. Accordingly, the controller 17 clears the flag information from the logged-in user item of the relevant user in the detected-user list in step S107, and causes the logged-in user to forcedly log out from the multifunction apparatus 10 in step S108. If the logged-in user moves outside the detection range 5 within a fixed time period, the record (detected-user information) of the logged-in user is deleted from the detected-user list, so that the flag information is cleared from the logged-in user item.

In contrast, if the terminal ID of the portable terminal 34 carried by the logged-in user is registered in the user information and is thus linked with the user ID of the relevant user (Y in step S103), the logged-in user detector 12 operates in cooperation with the near-field communication device 2 to measure the position of the portable terminal 34 corresponding to the terminal ID in step S104, thereby detecting the location of the logged-in user.

If the location of the detected logged-in user is within the detection range 4 (Y in step S105), it is presumed that the logged-in user is using the multifunction apparatus 10 unless the logged-in user performs a log-out operation. If it is presumed that the logged-in user is using the multifunction apparatus 10 and that a log-out operation is not performed (N in step S106), the process transfers to step S104 described above for measuring the position of the portable terminal 34 of the logged-in user. In contrast, if the user has clearly performed a log-out operation (Y in step S106), the controller 17 clears the flag information from the logged-in user item of the relevant user in the detected-user list in step S107 and causes the logged-in user to forcedly log out from the multifunction apparatus 10 in step S108.

If the logged-in user is not detected within the detection range 4 (N in step S105), it is presumed that the user is not continuously using the multifunction apparatus 10. Accordingly, the controller 17 clears the flag information from the logged-in user item of the relevant user in the detected-user list in step S107 and causes the logged-in user to forcedly log out from the multifunction apparatus 10 in step S108.

If the multifunction apparatus 10 is a large-scale apparatus and a printed-material output tray is located distant from the operation panel or if another device equipped in the multifunction apparatus 10 is handled, it may sometimes be difficult for the logged-in user to operate the operation panel 1 within the fixed time period. In this case, when the existing timer-based automatic log-out process is applied, the logged-in user may be logged out from the multifunction apparatus 10 despite the intention of the logged-in user.

According to this exemplary embodiment, even when the logged-in user is not operating the operation panel 1, if it is detected that the logged-in user is located within a predetermined range from the multifunction apparatus 10, that is, within the detection range 4, it is presumed that the multifunction apparatus 10 is in use and control is performed such that the logged-in user is not automatically logged out from the multifunction apparatus 10. In this exemplary embodiment, the convenience of the logged-in user is achieved in this manner.

In this exemplary embodiment, if a user carrying a portable terminal 34 with a terminal ID not registered in the user information logs into the multifunction apparatus 10, the multifunction apparatus 10 becomes usable by applying the existing automatic log-out process in step S109. Alternatively, even if a user carrying a portable terminal 34 with a terminal ID not registered in the user information inputs correct authentication information, control may be performed such that the user is logged out immediately without applying the existing automatic log-out process, thereby forbidding the user from using the multifunction apparatus 10.

The process performed when a user performs a log-in process has been described above. The following description relates to detection of a second user other than a logged-in user.

The near-field communication device 2 operates at all times. When a portable terminal 34 is detected within the detection range 5, the controller 17 acquires the terminal ID of the portable terminal 34 detected by the near-field communication device 2, searches for a matching terminal ID registered in the user-information storage unit 18, and identifies the user corresponding to the matching terminal ID, that is, the user carrying the portable terminal 34. The user detector 13 and the controller 17 operate in cooperation with the near-field communication device 2 in this manner so as to detect the user. In other words, unless the user ID and the terminal ID are linked with each other in the user information, it may be not possible to identify the user. In this exemplary embodiment, the configuration used for detecting the second user is changed in accordance with whether or not the user ID and the terminal ID are linked with each other in the user information.

Specifically, with the user ID and the terminal ID being linked with each other in the user information, if the user detected within the detection range 5 is identifiable based on the terminal ID of the portable terminal 34 detected by the near-field communication device 2, as described above, the user approaching the multifunction apparatus 10, that is, the user located within the detection range 5, is detected by using the near-field communication device 2. On the other hand, if the user carrying the portable terminal 34 is not identifiable due to the user ID and the terminal ID being not linked with each other in the user information, the human sensor 3 is used in place of the near-field communication device 2 to detect the user approaching the multifunction apparatus 10. Specifically, the second-user detection range (second predetermined range) is switched from the detection range 5 to the detection range 6.

As an alternative to this exemplary embodiment in which the human sensor 3 is used, a user may be identified by face authentication using the camera 31.

Figure 6:
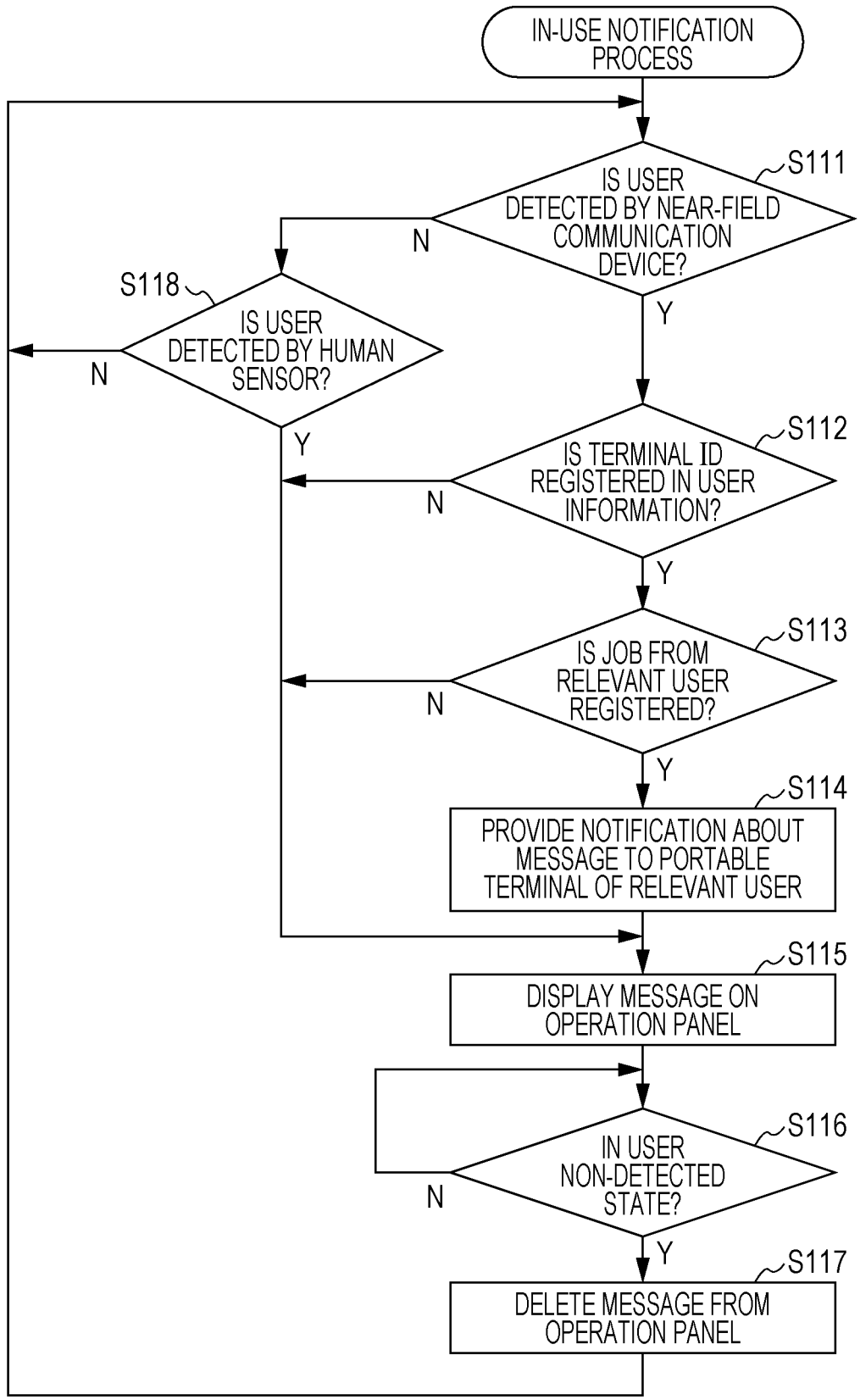
FIG. 6 is a flowchart illustrating an in-use notification process according to this exemplary embodiment.

In this exemplary embodiment, if the logged-in user is not distant from the multifunction apparatus 10 (i.e., if the logged-in user is located within the detection range 4), the logged-in state is maintained assuming that the multifunction apparatus 10 is being continuously used. However, because the logged-in user is not located in front of the operation panel 1, the second user may possibly move to a position in front of the operation panel 1 of the multifunction apparatus 10 by mistakenly believing that the multifunction apparatus 10 is in a usable state regardless of the fact that the multifunction apparatus 10 is actually in a non-usable state. In this exemplary embodiment, a function for notifying the second user that the multifunction apparatus 10 is in use is provided for the convenience of the second user. The following description with reference to a flowchart shown in FIG. 6 relates to an in-use notification process according to this exemplary embodiment. Once the multifunction apparatus 10 is activated, a program for this process continues until the multifunction apparatus 10 is shut down.

First, if a user is not detected by the near-field communication device 2 or the human sensor 3 (N in step S111 or N in step S118), the detection process is repeated until a second user is detected. Then, if the near-field communication device 2 detects a second user, that is, if the terminal ID of the portable terminal 34 carried by the second user is acquired (Y in step S111), the controller 17 checks whether or not there is a job from the user with the user ID linked with the acquired terminal ID if the terminal ID is registered in the user information of the relevant user (Y in step S112).

If the job from the relevant user is registered in the job-information storage unit 19 (Y in step S113), the controller 17 causes the message transmitter 16 to provide a push notification about a message to the portable terminal 34 identifiable from the terminal ID in step S114. This message includes contents indicating that the multifunction apparatus 10 is currently being used by another user (i.e., the logged-in user). Upon receiving the message, the portable terminal 34 displays the received message on, for example, a pop-up screen.

A second user entering the detection range 5 may be simply passing by the multifunction apparatus 10 instead of having the intention of using the multifunction apparatus 10. Transmitting a message indicating that the multifunction apparatus 10 is in use to the second user who is simply passing by in this manner may not always be a desired process. This exemplary embodiment focuses on a job registered in the multifunction apparatus 10, and if the detected second user is a user who has transmitted the job received by the job receiver 15 and not processed yet, it is determined that there is a high possibility that the second user has approached the multifunction apparatus 10 to operate the registered job, and a message is transmitted to the portable terminal 34 carried by the second user.

Therefore, if the detected second user has not registered the job in the multifunction apparatus 10 (N in step S113) and if the portable terminal 34 serving as a message transmission destination is not identifiable due to the terminal ID being not registered in the user-information storage unit 18 (N in step S112), the controller 17 gives a command to the UI processor 14 to display the message on the operation panel 1 in step S115. This message may have the same contents as the message transmitted to the portable terminal 34. However, it is desirable that the message be visually recognizable without the second user having to approach the operation panel 1 to a large degree, such as displaying the message with a large font size.

When transmitting the message to the portable terminal 34 and causing the portable terminal 34 to display the message in step S115, the message may also be displayed on the operation panel 1. In a case where the human sensor 3 detects the second user (Y in step S118), the message is similarly displayed on the operation panel 1 in step S115.

Then, while the second user is being detected, the display on the operation panel 1 is maintained (N in step S116). When the second user is no longer detected (Y in step S116), the controller 17 gives a command to the UI processor 14 to delete the message displayed on the operation panel 1 in step S117.

According to this exemplary embodiment, the second user approaching the multifunction apparatus 10 is notified that the multifunction apparatus 10 is in use. Accordingly, the second user may be informed that the multifunction apparatus 10 is in a non-usable state.

Even if the message indicating that the multifunction apparatus 10 is in use is displayed on the operation panel 1, there is still a possibility that the second user other than the logged-in user may try to operate the operation panel 1. The controller 17 may control the operation panel 1 not to accept a user operation when the message indicating that the multifunction apparatus 10 is in use is being displayed. However, since the logged-in user is the user using the multifunction apparatus 10, the controller 17 may control the operation panel 1 to accept a user operation when the logged-in user is located at a position where the user is capable of operating the operation panel 1, that is, when the logged-in user is detected within the operable range 7 shown in FIG. 1, even if the message indicating that the multifunction apparatus 10 is in use is being displayed. Whether a user is a logged-in user or not may be confirmed from the terminal ID of the portable terminal 34 carried by the logged-in user. Alternatively, whether a user located within the operable range 7 is a logged-in user or not may be confirmed by face authentication using the camera 31.

The above-described exemplary embodiment relates to an example where the multifunction apparatus 10 serves as an information processing apparatus. Alternatively, the exemplary embodiment is applicable to other information processing apparatuses used exclusively by being logged in.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
identify a logged-in user located within a first predetermined range from the apparatus and a second user located within a second predetermined range from the apparatus,
control such that performs to provide a notification that the apparatus is in use to the second user entering the second predetermined range when a logged-in user is located within the first predetermined range from the apparatus, and
wherein the second predetermined range is different range from the first predetermined range.

2. An information processing apparatus comprising:
a processor configured to:
perform control such that, when a logged-in user is located within a first predetermined range from the apparatus, a second user approaching the apparatus is notified that the apparatus is in use,
identify the user located within the first predetermined range from the apparatus;
identify the second user located within a second predetermined range encompassing the first predetermined range from the apparatus, and
perform control to provide a notification to the second user entering the second predetermined range when the user is identified by a near-field communication interface.

3. The information processing apparatus according to claim 2, wherein the processor further configured to:
receive a process request from a user,
perform control to notify the second user that the apparatus is in use if the second user identified is the user who has made the process request received and not processed yet.

4. The information processing apparatus according to claim 1, further comprising:
a display device, wherein the processor further configured to perform control to cause the display device to display a message indicating that the apparatus is in use.

5. The information processing apparatus according to claim 4,
wherein the processor further configured to perform control such that the display device does not accept a user operation when the message indicating that the apparatus is in use is being displayed.

6. The information processing apparatus according to claim 5,
wherein the processor further configured to perform control such that the display device accepts a user operation when the user is located at a position where the user is capable of operating the display device.

7. The information processing apparatus according to claim 1, further comprising:
a near-field communication interface that performs near-field communication,
wherein if the second user is carrying a wireless communication device, the processor further configured to perform control to cause the near-field communication interface to transmit a message indicating that the apparatus is in use to the wireless communication device.

8. The information processing apparatus according to claim 2,
wherein the processor further configured to change a configuration used for identifying the second user in accordance with whether or not the second user and a wireless communication device carried by the second user are linked with each other.

9. The information processing apparatus according to claim 8,
wherein if the second user and the wireless communication device carried by the second user are linked with each other, the processor further configured to identify the second user by using near-field communication.

10. The information processing apparatus according to claim 8,
wherein if the second user and the wireless communication device carried by the second user are not linked with each other, the processor further configured to identify the second user by using at least one of a sensor unit and an imaging unit and sets the second predetermined range as an identifying range by the sensor unit or the imaging unit.

11. The information processing apparatus according to claim 1,
wherein the apparatus is presumed as being used by the user when the user is located within the first predetermined range.

12. A non-transitory computer readable medium storing a program causing a computer to execute a process for processing information, the process comprising:
identifying a logged-in user located within a first predetermined range from the apparatus and a second user located within a second predetermined range from the apparatus,
controlling such that performs to provide a notification that the apparatus is in use to the second user entering the second predetermined range when a logged-in user is located within the first predetermined range from the apparatus, and
wherein the second predetermined range is different range from the first predetermined range.

* * * * *